United States Patent [19]

Jensen

[11] Patent Number: 5,245,464
[45] Date of Patent: Sep. 14, 1993

[54] DEFLECTING INSTRUMENT, CONTROLLABLE REFLECTING DEVICE HEREFOR AND USE HEREOF

[75] Inventor: Palle R. Jensen, Cobenhagen, Denmark

[73] Assignee: Laser Scan Vision Aps, Frederiksberg, Fed. Rep. of Germany

[21] Appl. No.: 895,378

[22] Filed: Jun. 8, 1992

Related U.S. Application Data

[63] Continuation-in-part of Ser. No. 640,306, Jan. 24, 1991, abandoned.

[51] Int. Cl.$^5$ ............................................. G02B 26/08
[52] U.S. Cl. ...................................... 359/224; 359/223
[58] Field of Search ................. 359/223–224, 359/213–214

[56] References Cited

U.S. PATENT DOCUMENTS

| | | | |
|---|---|---|---|
| 3,544,201 | 12/1970 | Fowler et al. | 359/224 |
| 3,758,199 | 9/1973 | Thaxter | 359/224 |
| 3,928,778 | 12/1975 | Ivanov et al. | 359/223 |
| 3,981,566 | 9/1976 | Frank et al. | 359/224 |
| 4,129,930 | 12/1978 | Dragt | 359/223 |
| 4,203,654 | 5/1980 | Ellis | 359/224 |
| 4,436,364 | 3/1984 | Lauer et al. | 359/214 |
| 4,660,941 | 4/1987 | Hattori et al. | 359/224 |
| 4,708,420 | 11/1987 | Liddiard | 359/224 |
| 4,732,440 | 3/1988 | Gadhok | 359/223 |

FOREIGN PATENT DOCUMENTS 2557814  4/1977  Fed. Rep. of Germany.
52-40215 10/1977  Japan.

Primary Examiner—Bruce Y. Arnold
Assistant Examiner—James Phan
Attorney, Agent, or Firm—Merchant & Gould

[57] ABSTRACT

A line-code reader having a deflection instrument with a laser, from which light in a laser-sweep pattern from an electrically controllable reflecting device is transmitted towards a rotating mirror, and via additional stationary mirrors the light is thrown down towards a product with a line-code label which is to be read. The light reflected from the line-code label is scanned by means of a photocell. The controllable reflecting device in the deflection instrument is supplied with electrical signals or voltages of a frequency or modulated with a frequency of or in the vicinity of the resonant frequency or harmonics hereof for the mechanical oscillation system of which the mirror forms a part.

18 Claims, 10 Drawing Sheets

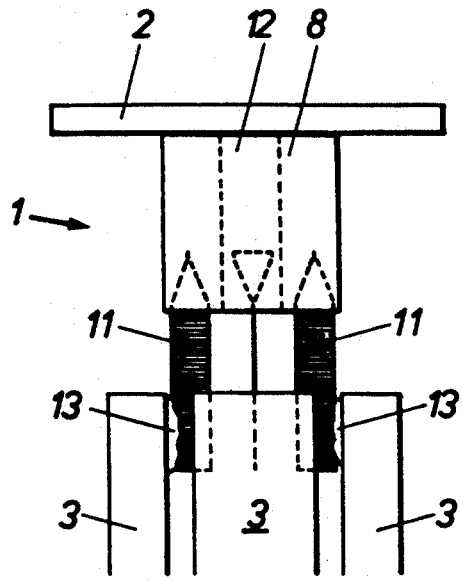 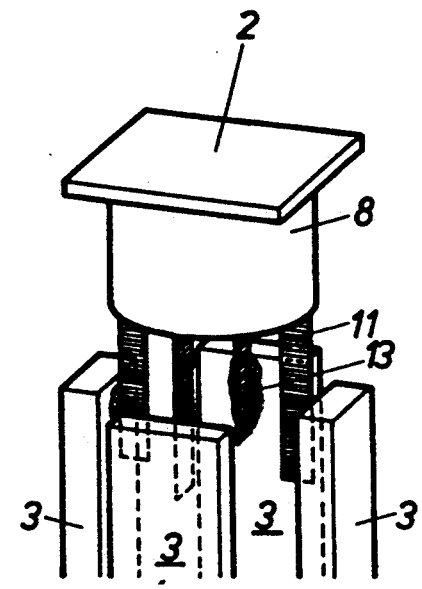
Fig.11　　　　　　Fig.12
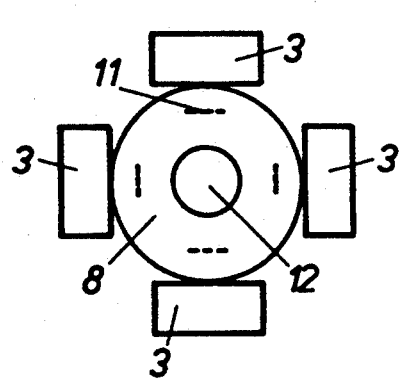 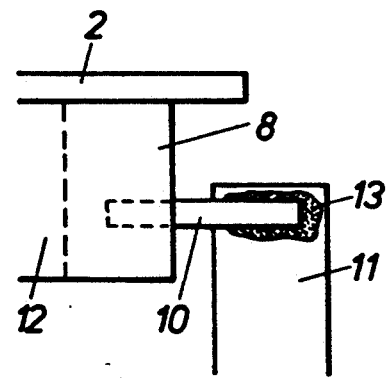
Fig.13　　　　　　Fig.14

DEFLECTING INSTRUMENT, CONTROLLABLE REFLECTING DEVICE HEREFOR AND USE HEREOF

CROSS REFERENCE TO PARENT APPLICATION

This application is a continuation-in-part of copending U.S. patent application Ser. No. 07/640,306, filed Jan. 24, 1991, now abandoned.

FIELD OF THE INVENTION

The invention relates to a light deflection instrument.

BACKGROUND OF THE INVENTION

Electrically-controllable reflecting devices are known, for example from Japanese patent publication no. 52-40215, wherein the reflecting device comprises a mirror mounted on two or more arms of piezoelectric material, possibly flexible piezoelectric material, which upon application of an electrical voltage between the upper side and the lower side of the crystal material causes the arms to bend slightly. If the crystal materials are connected in pairs to the applied voltage in counter-phase, the mirror will tilt, and thus it is possible to electrically control the tilting of the mirror both with regard to the extent of the tilt and its direction. If four crystals in cruciform configuration are used, the mirror can be controlled so that an incident beam of light can be reflected as desired. The deflection of the mirror is, however, quite small, in that the maximum deflection of the crystal is in the order of 0.05 mm to each side, and the practical use of such devices is therefore strongly limited. In order to increase the deflection of the mirror, and to make it possible to use a thicker and herewith a more solid but also heavier mirror, a number of crystal elements can be mechanically coupled in series, which is known for example from U.S. Pat. No. 4,660,941. However, this results in a mechanically complicated construction, and while the possibility is no doubt provided of greater mirror deflection, the deflection on the other hand is considerably slower, which for some applications is totally unacceptable.

From U.S. Pat. No. 3,981,566, a deflection device is known which has a flexible and bendable coupling part disposed between the crystal and the mirror, so that the stiff deflection of the crystal elements can be transferred to the mirror by a kind of hinge effect. This results, however, in a certain attenuation, so that for many applications the speed of the deflections is inadequate. Similarly, the amplitude of the deflection is limited to the amplitude of the crystal.

The whole of the known technique in this field has limitations with regard to the magnitude of the tilting of the mirror, even though attempts are made, as disclosed in U.S. Pat. No. 3,981,566, to allow the deflections of the crystal elements to be transferred to the mirror as closely as at all possible to its center.

The object of the invention is therefore to increase the deflection of the mirror as much as possible, and hereby extend the possibilities of application for such devices.

This is achieved by configuring the instrument according to the invention in that sufficient energy is constantly applied to the mechanical oscillation system for the resonant oscillations to be maintained at one or more of the system's resonant frequencies. This results in the deflection of the mirror or the mirrors being multiplied many times, depending on the efficiency of the oscillation system. By constructing the mechanical oscillation system in different ways and with the use of different materials, it can be configured so that it assumes one or more resonance frequencies of the desired extent and amplitude, depending on the application for which the instrument is to be used.

By configuring the deflection instrument according to the invention as disclosed and characterized in that the movable elements are not all supplied with electrical signals or voltages of the same frequency, the possibility is provided of generating almost any oscillation pattern for the mirror or the mirrors, and one can hereby make a beam of light which is directed onto the mirror or the mirrors, after reflection from said mirror or mirrors, describe almost any desired path.

The deflection instrument according to the invention can be configured as disclosed and characterized in that the movable elements are piezoelectric crystal elements, so-called bimorph actuators, in that this hereby enables the construction of a very compact instrument which is easy to "pump" with oscillation energy, while at the same time control the direction of the mirror's mechanical oscillations.

The deflection instrument according to the invention can also be configured as disclosed and characterized in that the movable elements are electromagnetic elements, or elements coupled to electromagnetic elements. This manner of applying energy to the oscillating system is particularly suitable if several mirrors are to oscillate in step with one another, but moreover has the advantage that it does not demand operational voltages as great as those necessary for the crystal elements.

By configuring the deflection instrument as disclosed and characterized in that in the light path in front of the instrument there is disposed at least one rotating mirror and possibly one or a number of stationary mirrors, the reflected light can be made to spread itself over a very much greater area, which is particularly advantageous if the instrument is used for the generation of laser-sweep patterns, e.g. for the reading of line codes for example on goods at a cash terminal, in that with this configuration a high sweep-rate as well as a large deflection can be achieved, and at the same time herewith control over the shape of the pattern.

The invention also relates to a controllable reflecting device which can be used in deflection instruments as described above. By configuring the reflecting device as disclosed and characterized above, the possibility is provided of maximizing the deflection and of a relatively simple assembly process for the mirror, which is normally glued directly to a rubber or plastic mounting. The possibility is also provided of achieving more uniform products, and by the selection of the type of plastic or rubber one can change the characteristics of the mirror system with regard to resonant frequencies and quality. By configuring or disposing the plastic or rubber cylinder asymmetrically or as a rectangular cylinder instead of a circular cylinder, one can generate various resonant frequencies in different directions.

The invention also relates to a controllable reflecting device which can be used in deflection instruments as described above. By configuring the controllable reflecting device as characterized above, the possibility is provided of achieving a very precise tilting or deflection of the mirror without any significant harmonics. Moreover, the characteristics of the mechanical oscillation system can be varied by the use of balls of different sizes, by the use of different binding materials etc.

By configuring the controllable reflecting device according to the invention as disclosed and characterized in that the movable elements are elongated, substantially rectangular piezoelectric crystal elements with a short side facing towards the mirror and offset for substantially half of their breadth in relation to the central area of the mirror, the possibility is provided of achieving a very large deflection, in that it becomes possible to dispose the balls closely to each other and close to the center of the mirror, so that a maximum mirror deflection is achieved for a given deflection of the crystal elements.

By configuring the controllable reflecting device according to the invention as disclosed and characterized in that four elongated, substantially rectangular piezoelectric crystal elements are used, these being arranged in pairs in parallel and with coincident longitudinal axes, the possibility is provided of producing it as a very small and slim construction, for example so that the whole of the reflecting device can be disposed in a tube with an opening for the light.

By configuring the controllable reflecting device according to the invention as disclosed and characterized in that the piezoelectric crystal elements are not all of the same length, different resonance frequencies can be generated in different directions in a simple manner, so that the reflected light can be made to describe a path with a desired form or direction.

SUMMARY OF THE INVENTION

The invention has been developed mainly for use in sensing devices such as those in cash terminal installations, stock control installations or other installations which use optically readable line codes. If several synchronously oscillating mirrors are used in the device, one mirror can be used for emitting the laser-sweep pattern, and the others can be used for detecting the reflected light. One hereby achieves quick reading of a line-code label, particularly if it is not positioned in a certain way, which for example is the case with line-code labels on foodstuffs on a conveyor belt at a cash terminal.

BRIEF DESCRIPTION OF THE DRAWINGS

The invention will now be described in more detail with reference to the drawing, in that FIGS. 1A and 1B show the principle of the electrically controllable reflecting device according to a first embodiment of the invention;

FIG. 11 shows a sixth embodiment of a controllable reflection device according to the invention;

FIG. 12 shows the same as in FIG. 11, but in perspective;

FIG. 13 shows the same as in FIG. 11, but seen from below;

FIG. 14 shows the same as in FIG. 11, but with an alternative method of securing the plastic or rubber cylinder;

DESCRIPTION OF THE PREFERRED EMBODIMENT

Figure 1A:
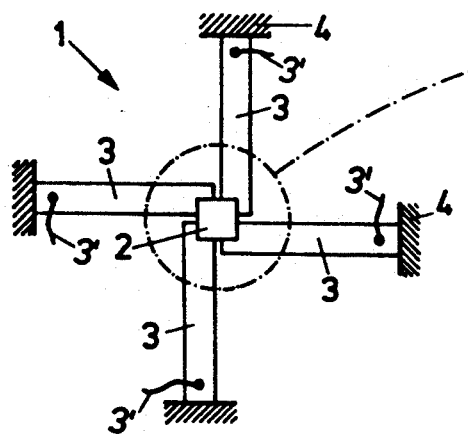
Figure 1B:
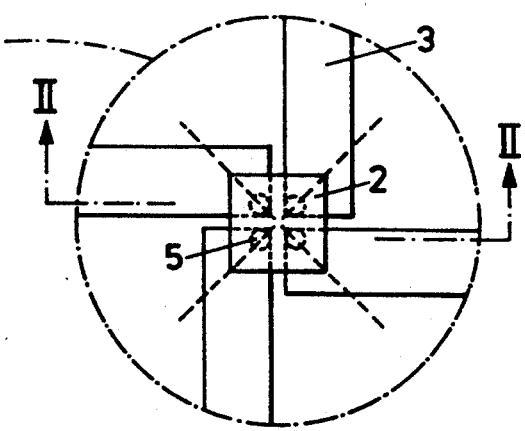
Figure 2:
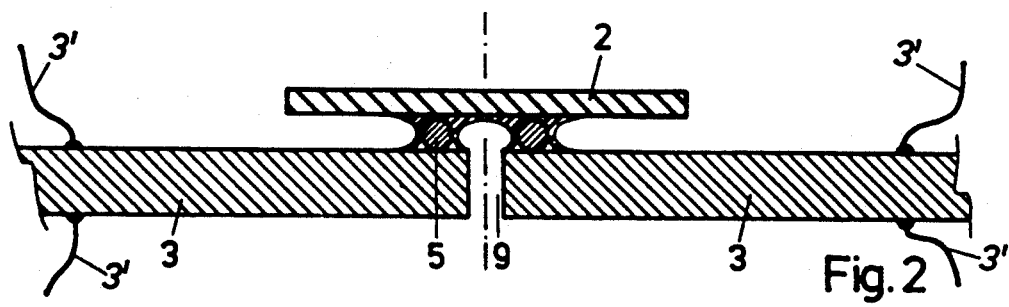
FIG. 2 shows on a larger scale a section along the line II—II in FIG. 1B.
Figure 3:
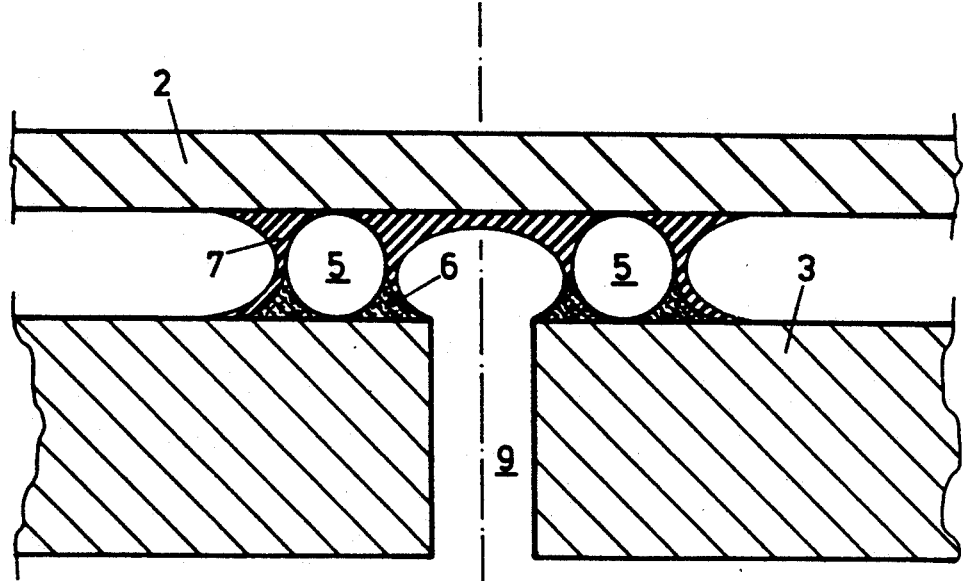
FIG. 3 shows a section in FIG. 2 on an even larger scale.

In FIGS. 1-3 of the drawing it will be seen that a small surface mirror 2 is mounted on four arms 3, said arms being piezoelectric crystal elements, so-called bimorph actuators which, for example, are of the type 4322 020 08250 manufactured by Philips. The size of such actuators in the order of 1.6×0.6×12 mm. Together, the mirror 2 and the crystals 3 constitute an electrically controllable reflection device 1. When a potential difference is applied between the upper and the lower sides of the crystals through the leads 3', the crystal will bend. If, as shown in FIG. 1, the elements are secured in a stationary part 4, the free ends will be raised or lowered, depending on the polarity and strength of the potential difference.

The crystal elements are arranged together in a staggered cross, in that opposite elements are completely offset from each other, but where all of the elements are arranged so that they form a right-angled cross. Between the free ends there are gaps 9 in the order of 0.1–0.5 mm.

The mirror 2 in the shown embodiment is square, but naturally this can be of any desired shape. Its size is in the order of 3×3 mm and it is as thin as is practically possible, i.e. of a thickness of less than 0.5 mm.

As closely as possible to the center-facing corner of the elements 3, a bearing element in the form of a ball 5 is secured on each element, said ball having a diameter in the order of or less than 0.5 mm, so that the four balls form a square with as small a side length as practically possible, e.g. 1×1 mm or less. The balls 5 are glued to the elements 3, e.g. with epoxy adhesive or the like, and the mirror is coupled to all of the balls 5 by means of a flexible binding agent 7, e.g. silicone rubber or the like. The bearing elements 5 do not need to be balls, in that elements of other shapes can be used, e.g. cylindrical or box-shaped, though preferably with double curvature surface at the coupling to the mirror. The bearing elements can be shaped or fashioned so that the binding agent adheres better hereto, and the mirror can herewith be given greater effects. The bearing elements can be balls of steel or glass, plastic etc., and can be configured with a special surface structure which increases the adhesion. The bearing elements must be large enough to lift the mirror completely free of the elements 3 at maximum deflection, i.e. a diameter of less than 0.5 mm is normally sufficient.

Figure 4:
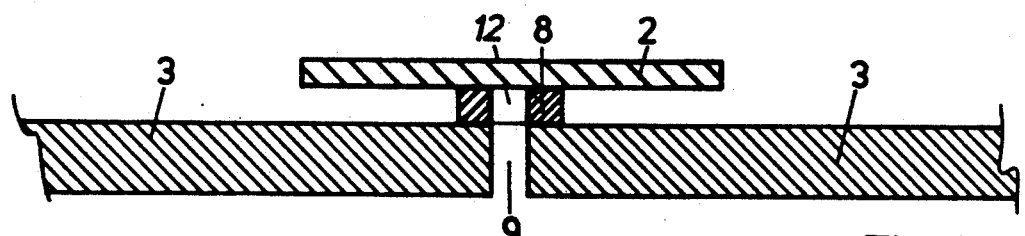
FIG. 4 shows the principle of the controllable reflecting device according to a second embodiment of the invention, and shown in the same manner as FIG. 2.

In FIG. 4 is seen a second embodiment of the reflection device in which the mirror 2 is secured to the elements 3 by means of a rubber part 8 which, for example, as shown can be a cylindrical tube piece with a central opening 12 which is substantially coincident with the gap 9 between the arms 3. The rubber part is preferably produced of natural rubber or similar material, and is glued to the crystal elements 3 and the underside of the mirror 2.

Figure 5:
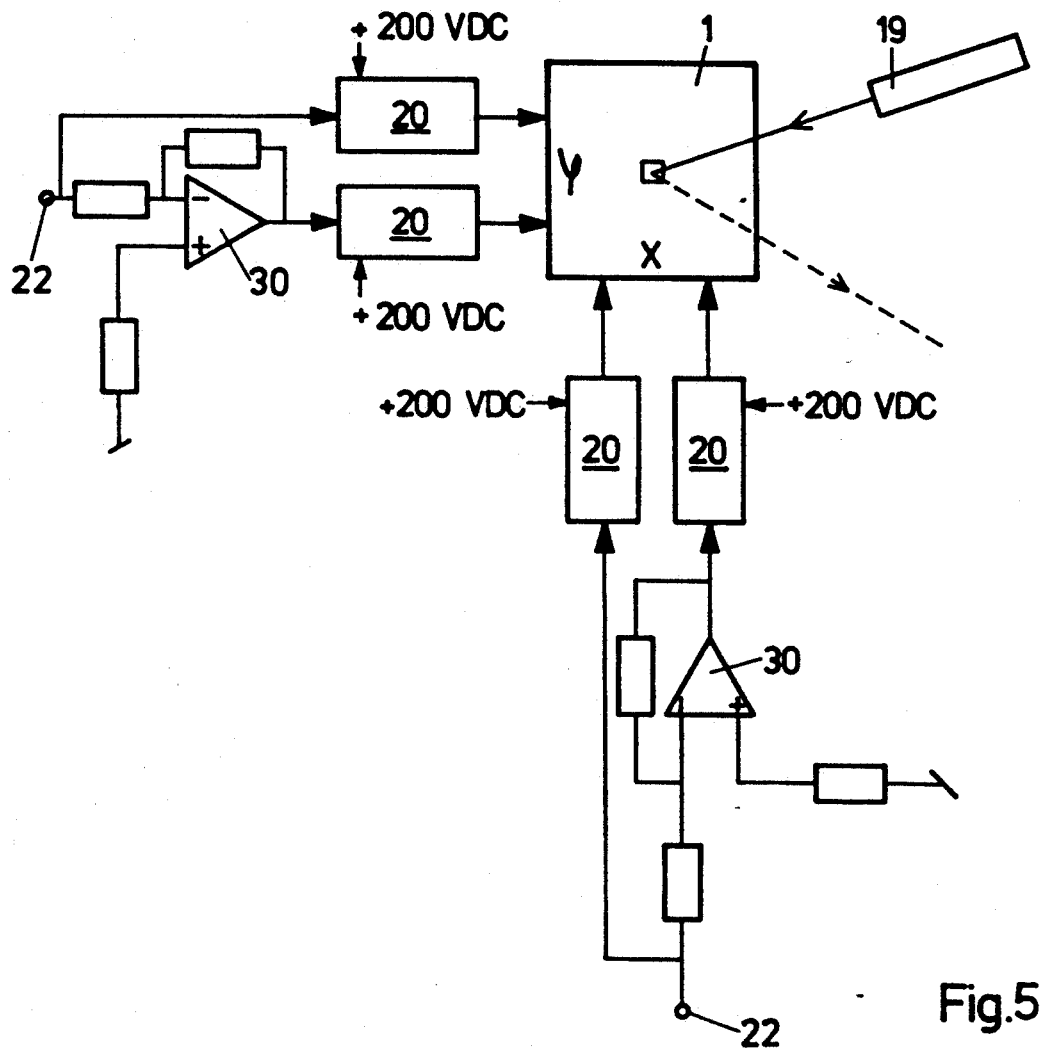
FIG. 5 shows an electrical block diagram which illustrates the control of a deflection instrument with a controllable reflection device according to the invention.

In FIG. 5 will be seen a block diagram of a deflection instrument according to the invention with a controllable reflection device 1. The light from a laser 19 is reflected from the mirror towards a wall or screen (not shown). Oppositely-lying elements in the reflection device 1 are electrically coupled in paris and in counterphase, so that those elements which lie in staggered extension of each other move in opposite directions in response to the same applied signal, i.e. the one element bends upwards and the oppositely-lying element bends downwards. The mirror will thus tilt around an axis through the balls or the rubber part, which is shown schematically by the stippled line in the segment figure in FIG. 1. In this manner, by applying suitable x-y signals to the two sets of elements, the mirror can be tilted in any desired direction, depending on the phase and the strength of the applied signals. The elements are driven by supplying them with a driving voltage from the drive circuit 20, which is supplied with a DC voltage in the order of +200 VDC. The control signals are applied to the input electrodes 22, and the one x-signal and the one y-signal are inverted by the inversion circuits 30 which, for example, are each built up with their own operational amplifiers as shown.

Figure 6:
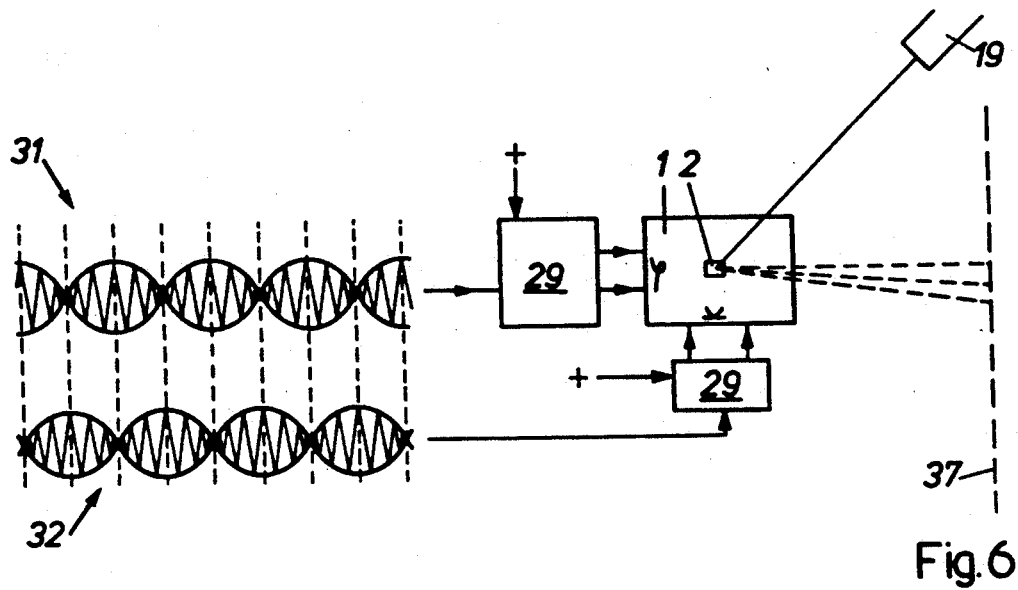
FIG. 6 shows an electrical block diagram which shows the control of a deflection instrument with a controllable reflection device according to a specially preferred embodiment of the invention.

In FIG. 6 is shown a specially preferred embodiment in which the reflection device is driven by two push-pull drive stages 29, one for the x-signals and one for the y-signals. The two push-pull stages 29 are supplied, for example, with control signals 31 and 32 as shown. In the embodiment shown, both of the signals 31 and 32 are saw-tooth shaped signal voltages modulated with a low-frequency, sinusoidal voltage of, for example, ½ of the frequency of the saw-tooth voltages. These voltages are not necessarily synchronized. The saw-tooth voltages have a frequency which lies in the same order as the resonant frequency of the mirror system 1, i.e. the resonant frequency of the mirror system plus rubber part plus possible additional coupling means for the crystal actuators, so that the applied control voltages 31 and 32 will make the mirror 2 tilt at its own resonant frequency, and thus the mirror deflection will be many times greater than the degree of deflection which can be achieved with the embodiment shown in FIG. 5.

Figure 7:
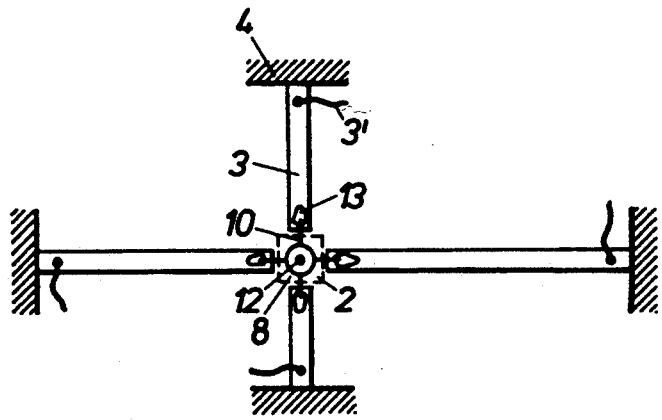
FIG. 7 shows a third embodiment of a controllable reflection device.
Figure 10:
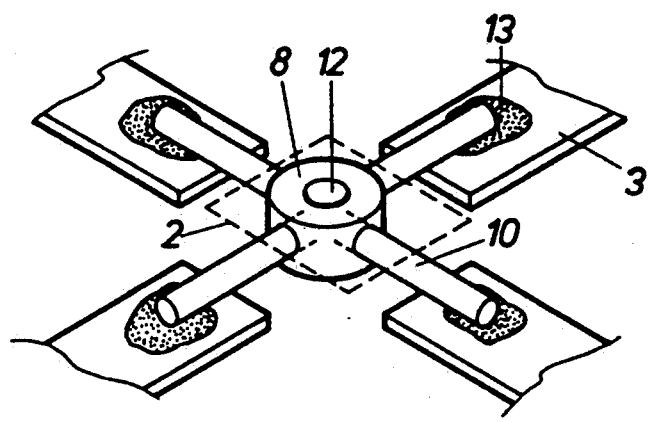
FIG. 10 shows the embodiment in FIG. 7 seen in perspective.

In FIGS. 7 and 10 is seen another embodiment of a controllable reflecting device 1 in which the cylindrical rubber part 8 is secured by means of a number of support elements 10, which are secured to the crystal elements 3 with a drop of glue 13. The four crystal elements in FIG. 7 can be of different lengths. Several resonant frequencies are herewith obtained in the mechanical oscillation system, and thus great deflection at various frequencies and in different directions can be achieved.

Figure 8:
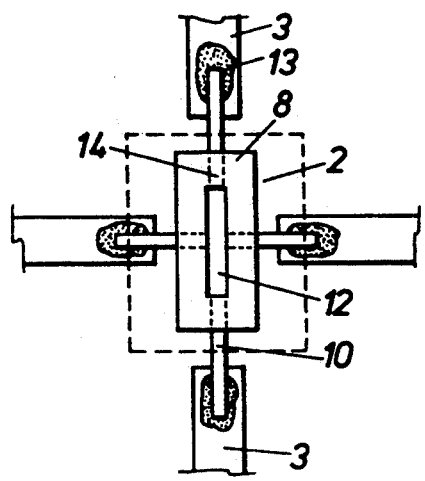
FIG. 8 shows a fourth embodiment of a controllable reflection device.

In FIG. 8 it will be seen that the flexible rubber part 8 can be configured or arranged in a unsymmetrical manner, so that various resonant frequencies in different directions can be obtained. As shown, the rubber part can, for example, be in the form of a rectangular cylinder instead of a circular cylinder as shown in FIG. 7.

Figure 9:
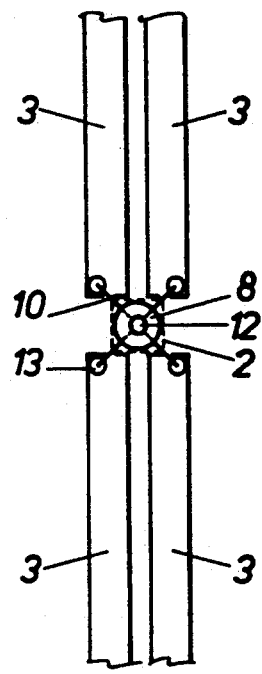
FIG. 9 shows a fifth and particularly advantageous embodiment of a controllable reflection device according to the invention.

In FIG. 9 is shown an embodiment in which the crystal elements 3 are arranged in parallel and opposite one another, thus providing the possibility of making the controllable reflection device very slim and compact, so that, for example, it can be built into a cylinder or the like. The crystals can, for example, be mounted secured between two print plates held together, and the print plates can be double layer plates and configured in such a manner that the pattern on the two layers is identical but merely turned differently.

The support elements 10 in FIGS. 7-9 are stiff pins, e.g. metal pins, which are glued firmly to the crystal elements 3 with a drop of glue 13. The support being pressed or molded into the rubber part, or the rubber part can be proved with openings 14 for this purpose. In FIGS. 7-10 the mirror 2 is shown with stippled lines.

In FIGS. 11-14 is shown an embodiment of the invention in which the crystal elements 3 are all parallel and disposed around the rubber part 8, on which the mirror 2 is glued. The crystal elements are (not shown) secured against a core with a rectangular or quadratic cross-section. On each crystal element there is mounted (glued) a support element 10 or 11 in the form of a pin 10 or a spring portion 11 which engages with the rubber. With this embodiment, the crystal elements 3 can be allowed to oscillate in phase by pairs. If leaf springs 11 are used, as shown, these can be molded into the rubber part 8 and glued to the crystal elements. The leaf springs allow oscillations in the two mechanical systems independently of each other and at right angles to each other. As shown, the molded in leaf springs can be deformed at the molded-in end in order to improve the adhesion. The coupling together can also be carried out by means of four pins as shown in FIG. 14, these being inserted radially into the lower part of the rubber cylinder and secured to the crystal elements via the leaf springs 11.

In all of the embodiments described in the above, the oscillatory energy for the mechanical oscillation system is supplied from electrically-controllable crystal elements. It is also possible to supply the energy in other ways, e.g. by means of an electromechanical system coupled to the rubber part.

Figure 15:
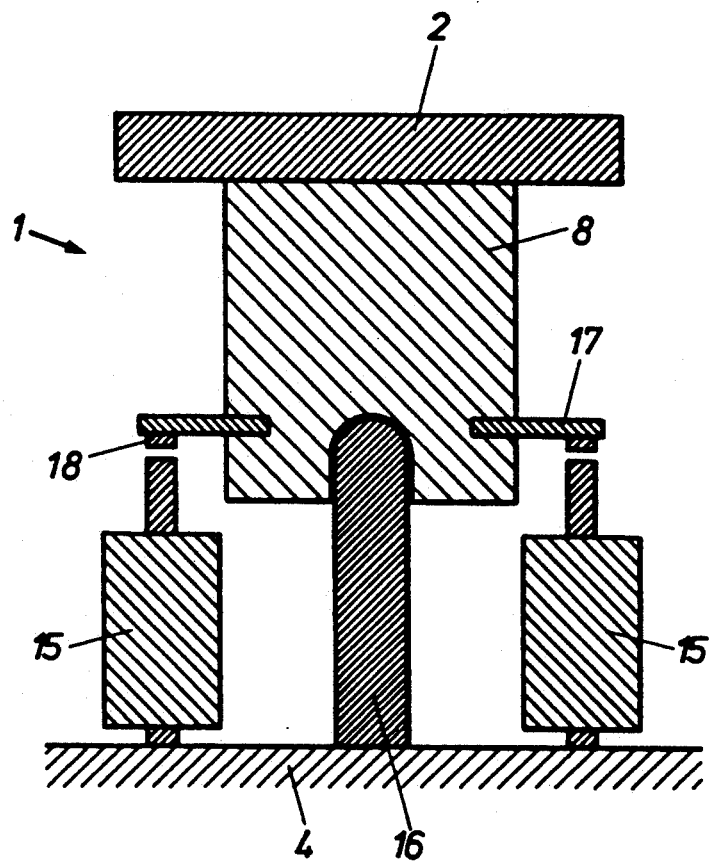
FIG. 15 shows a seventh embodiment of a controllable reflection device according to the invention, and with electromechanical drive system.

FIG. 15 shows a section of an embodiment of the invention in which the mechanical oscillation system is mounted on a guide pin 16 which, for example, is introduced into the opening in a rubber cylinder 8 on which a mirror 2 is glued. In the rubber part 8 there is secured an annular disk 17 which is influenced by a number of electromagnets 15, e.g. by employing permanent magnets 18 on the disk 17. If four magnets 18 and four electromagnets 15 are used, all turned oppositely pairwise, the rubber cylinder 8 with the mirror 2 can be brought into resonant oscillation in any desired direction by controlling the current to the electromagnets 15.

Figure 16:
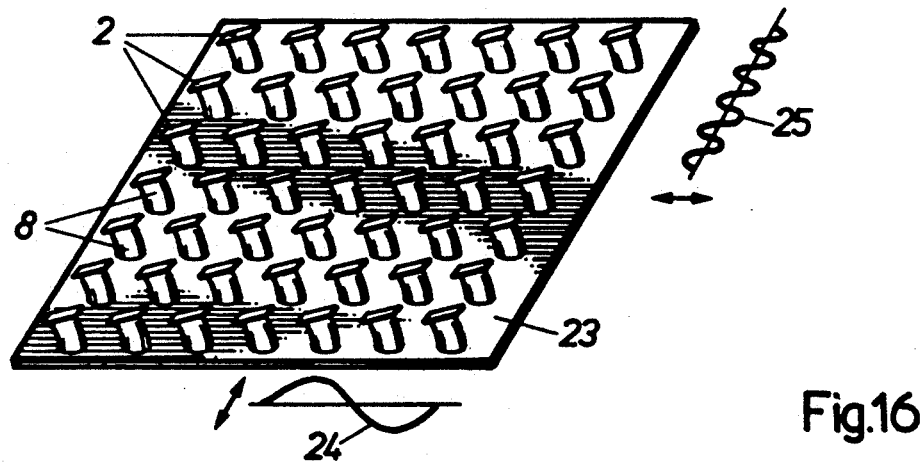
FIG. 16 shows an eighth embodiment of the invention, but in which may mirrors oscillate synchronously.

In FIG. 16 is seen the principle of an embodiment of the invention in which a mechanical oscillating system comprises a large number of mirrors 2, each mounted on a rubber part 8 which are all secured (glued) to a common support element 23. If the support element 23 is vibrated in the surface plane, by forced harmonic oscillation the mirrors are made to oscillate in a synchronized manner, so that together the mirrors function as one large mirror which vibrates just as rapidly and with the same amplitude as the small mirror systems. If the support element 23 is influenced by two different resonance frequencies, as indicated by the influencing signals 24,25, special patterns of movement can be achieved. The individual mirrors are arranged so closely together that the effective reflecting surface is made as large as possible, but far enough away from one another to ensure that there is no contact between them during the vibrations. When such a deflection instrument is used, e.g. in connection with the scanning of line-code labels, one of the mirrors, for example on of the central mirrors, can be used to emit the desired laser-sweep pattern which illuminates the line code, and all or some of the remaining mirrors can be used to scan the reflected light.

Figure 17:
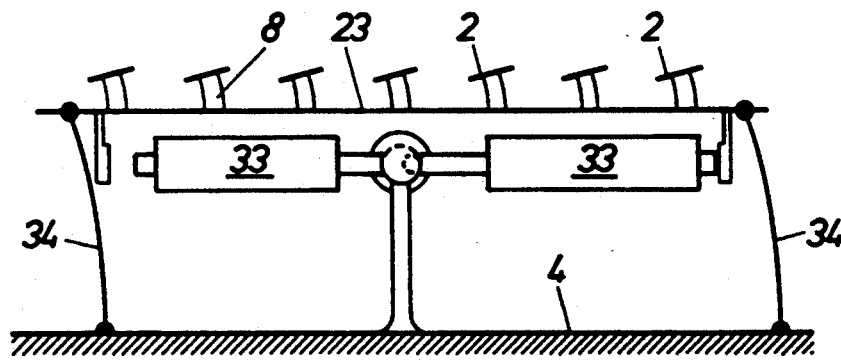
FIG. 17 shows an embodiment of an electromechanical drive system for the embodiment in FIG. 16.

FIG. 17 is a sketch showing an example of how the vibrations in the common support element 23 in FIG. 16 can be brought into oscillations with an electromagnetic traction coil system disposed closely under the support element 23. For example, the common support element 23 can be suspended in four spring wires 34, preferably at right angles to the surface. The electromagnetic drive system 33 will thus force the support element 23 to vibrate at right angles to the spring wires 34.

Figure 18:
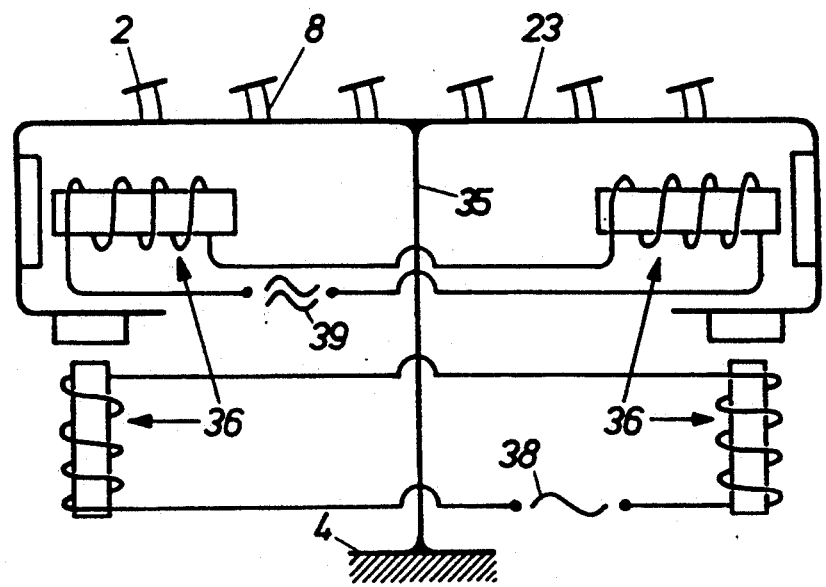
FIG. 18 shows an alternative embodiment of an electromechanical drive system for the embodiment shown in FIG. 16.

FIG. 18 is a sketch showing an alternative way of suspending the common support element by one centrally-placed spring wire 35, thus enabling the vibration of the support element 23 in its own plane to be overlaid by another vibration having its fulcrum in the securing point of the wire, which as shown can be arranged centrally in the support element. It is thus possible at one and the same time to obtain both rapid vibrations and a slow vibration, independently of each other, and this is achieved by influencing the electromagnetic drive systems 36 partly with rapid drive signal 39 and partly with a slow drive signal 38.

Figure 19:
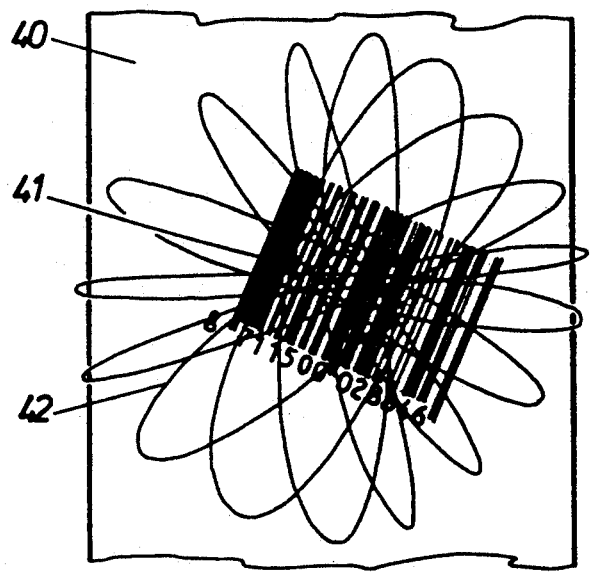
FIG. 19 shows a first example of the pattern of the beam path with the embodiment shown in FIG. 6.
Figure 20:
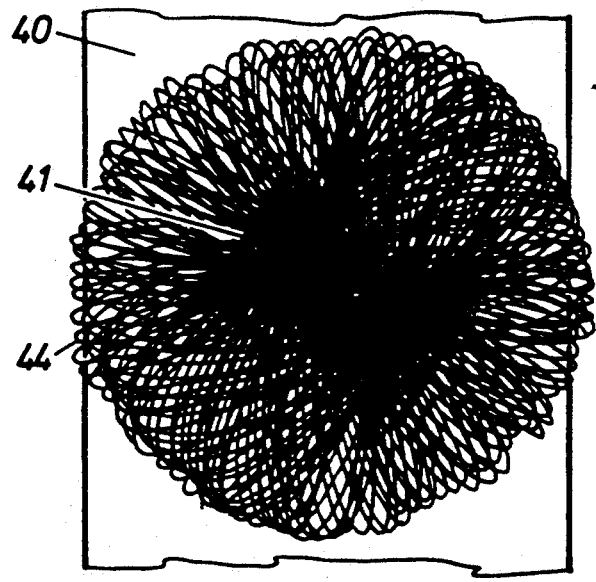
FIG. 20 shows a second example of the pattern of the beam path.
Figure 21:
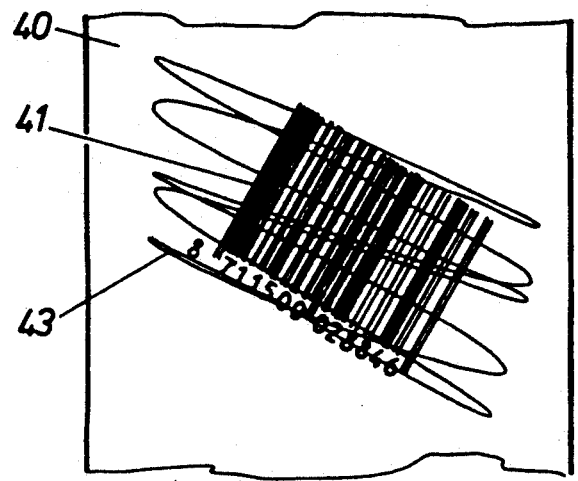
FIG. 21 shows a third example of the pattern of the beam path.

In FIGS. 19-21 are shown examples of the light patterns which arise on a plane arranged at a distance in front of the reflected beams of light from a controllable reflection device according to the invention, see for example the plane 37 place in front of the reflection system 1 in FIG. 6. If, for example, this plane is a conveyor 40 at a cash terminal or the like, on which a product with a line code label 41 is passing, it will be seen that the line code is scanned by the laser beam several times.

In FIG. 19 is shown the use of a resonant frequency of 2000 Hz with 8 complete sweeps per rotation, which occur with a frequency of 250 Hz, so that 250 complete patterns per second are generated.

In FIG. 20 is shown an example where a resonant frequency of 2000 Hz is also used, but where use is made of a set of deflection voltages which are not periodic. The area is hereby completely covered with light, in that the pattern is not repeated but constantly displaced, so that the whole area appears illuminated, the reason being that the laser beam is deflected so quickly that one is unable to perceive that only one scanning of the area is involved.

In FIG. 21 is shown an example where resonant frequencies are effected in the x-direction with 2000 Hz and deflections in the y-direction with 400 Hz. The picture shown is thus repeated 400 times per second.

Figure 22:
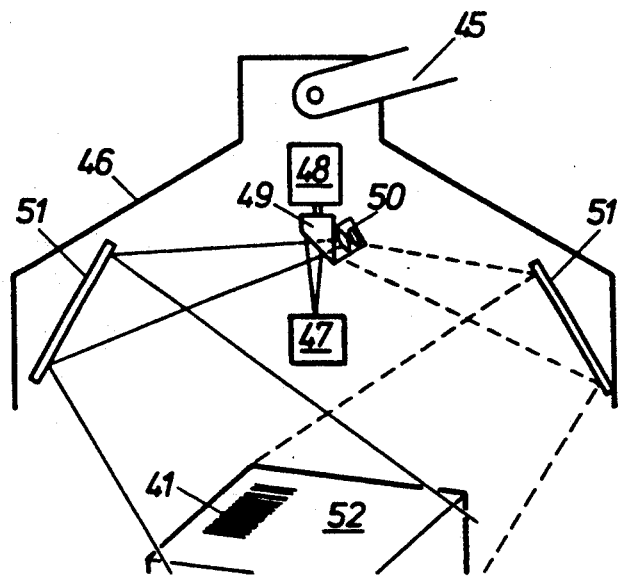
FIG. 22 shows, partly in section, a complete deflection instrument according to the invention for the scanning of a line-code label.

In FIG. 22 is seen a practical example of how the invention is used in connection with the scanning of line-code label. A screen 46 is secured in a pivotable holder 45 in such a way that the screen can be disposed, for example, over a conveyor on which goods 52 with line-code label 41 are conveyed.

Inside the screen 46 is placed a deflection instrument 47 with a laser, so that, for example, the pattern which is shown in FIG. 19 is emitted towards a mirror 49 rotated by a motor 48. From the mirror 49, the laser-beam pattern is thrown out onto a rotating or a number of stationary mirrors 51, so that the goods are illuminated from different sides, thus enabling the line-code label 41 to be scanned, even though it is not facing directly upwards. For the detection of the reflected light, one or more photocells 50 can be placed at or on the rotating mirror 49. The scanning pattern is hereby brought to cover all directions within the area swept with light.

Figure 23:
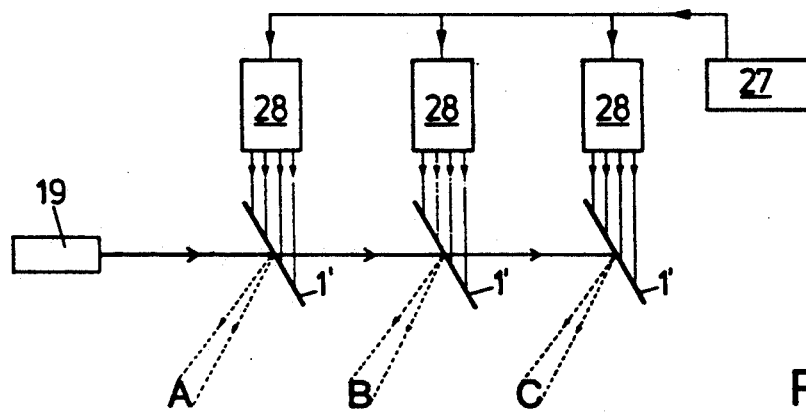
FIG. 23 shows an instrument according to an embodiment with a number of controllable reflection devices which are illuminated from the same light source.
Figure 24:
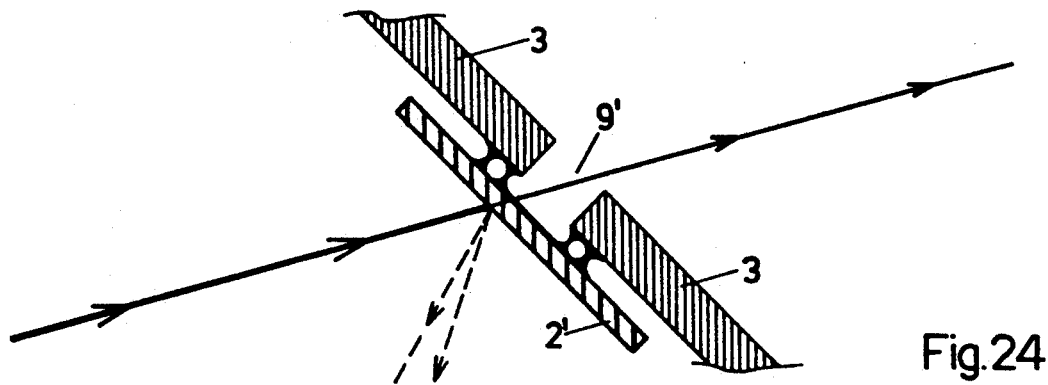
FIG. 24 shows a detail from FIG. 23 on a larger scale.

In FIGS. 23 and 24 is shown another embodiment of the reflecting device according to the invention, in that a number of reflection devices 1' are arranged in series with one laser 19, and where each reflection device 1' is controlled by each its control and driving circuit 28, which are all controlled by one common control circuit 27, e.g. a programmable computer. The reflection device is seen in greater detail in FIG. 24, and in this construction there is used a mirror 2' which is partly reflecting and partly translucent, so that the light from the laser 19 can reach all of the mirrors 2'. For practical reasons, it is necessary with this embodiment for the gap 9' between the elements 3 to be made so broad that the light beam can pass under all conditions. With such a device, a so-called rolling display can be generated, so that a series of characters can be written on a suitable screen placed in front of the device, all controlled by the electronic control circuit 27. With this application, use will be made mainly of reflection devices with balls between the crystal elements and the mirror, and of the kind which has been described in connection with FIGS. 1-3, in that with this construction a well-defined deflection is achieved without harmonics.

Figure 25:
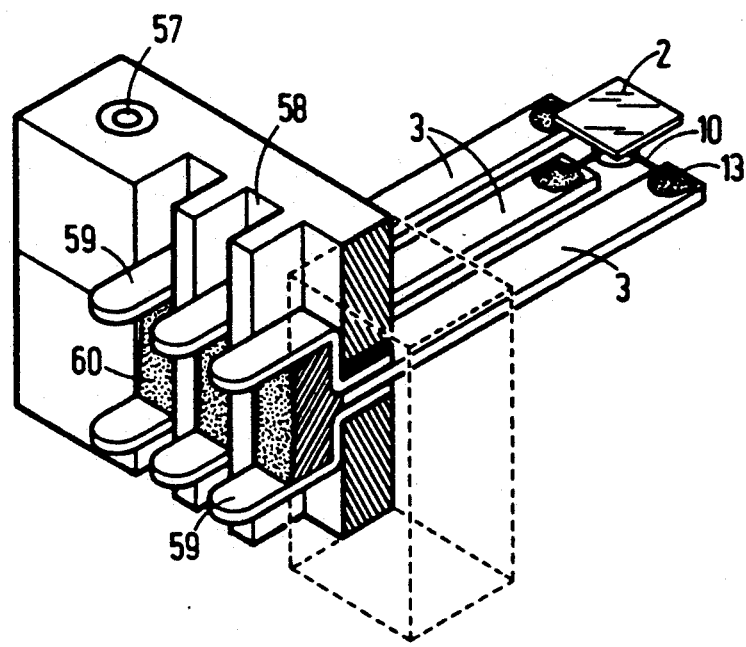
FIG. 25 shows the preferred embodiment of a controllable reflecting device according to the invention.
Figure 26:
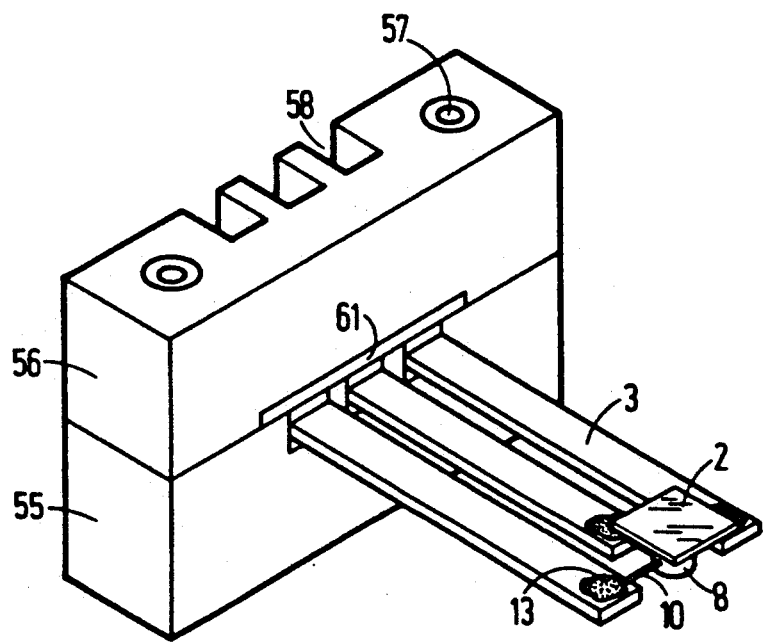
FIG. 26 shows the embodiment in FIG. 25 seen from the opposite side.

The embodiment according to FIGS. 25 or 26 comprises three piezoelectric crystal elements 3 arranged in parallel and in the same plane and where the middle element is shorter than the two outermost crystal elements. The mirror 2 is secured to a cylindrical rubber part 8, for example by means of glue, and is coupled to the three crystals 3 by means of three stiff pins 10 and glue 13, as explained above in connection with FIGS. 9 and 10.

At the ends opposite of the mirror the three crystal elements 3 are secured in a two-piece unit 55,56. At the same time electrical conductors 59 are inserted in pairs at each crystal 3, cf. FIG. 25 in particular. The conductors 59 are suitably bent and are moreover secured in parallel grooves 58 by means of molding material 60.

The parts 55,56 are pressed together by means of rivets or screws, and the electrical conductors 59 constitute electrical connection to both the underside and the over-side of the crystal elements 3. In order to ensure good contact or sufficient contact pressure, and to compensate for tolerances, an elastic element 61 of hard silicone or a similar insulating material is inserted.

The parts 55,56 are of an electrical insulating material, for example bakelite or a similar hard, stable and non-vibrating material.

The free ends of the conductors 59 constitute soldering lugs or wire wrap pins for electrical connection to the crystals 3.

Such a reflecting device has a maximum drive voltage of for example 200 V (at 2 mAmp) and a resonant frequency of typically 1000 Hz and can thus create a maximum deflection of 28 degrees.

Because of the asymmetrical support of the mirror 2, two different resonant frequencies may be obtained.

In the application, there is essentially only discussed transmission of light, i.e. the illumination of a surface with a laser-beam pattern. If this light pattern is used to illuminate line-code labels on goods, the scanning of the information contained in the line-codes is effected in a commonly known manner, i.e. by an optical scanning of the light reflected from the illuminated line-code label, and the transfer of the optically-scanned signals to electronic circuits of a known kind.

What is claimed is:

1. A deflecting instrument for light comprising at least one mirror supported by and coupled flexibly to a number of movable piezo-electric crystal elements, which are controllable under an application of electrical signals, and is arranged in such a manner that the mirror can be tilted away from a position of rest in any desired direction as a function of the electrical signals, said mirror being arranged to reflect incident light, wherein the electrical signals have a frequency, by a mechanical oscillation system comprising the mirror, the piezo-electric crystal elements and a flexible coupling means between them, and wherein the flexible coupling means includes a flexible plastic part which supports the mirror and is coupled to the crystal elements, said plastic part being configured as a cylindrical tube section with a throughgoing hole.

2. The deflecting instrument according to claim 1, wherein the piezo-electric crystal elements are not all supplied with electrical signals of the same frequency.

3. The deflecting instrument according to claim 1, wherein in a light path in front of the instrument there is disposed at least one rotating mirror and one stationary mirror.

4. The deflecting instrument according to claim 1, wherein the crystal elements are elongated, substantially rectangular piezo-electric crystal elements with a short side facing towards the mirror and offset for substantially half of their breadth in relation to a central area of the mirror.

5. The deflecting instrument according to claim 1, wherein four elongated, substantially rectangular piezo-electric crystal elements are used, these being arranged in pairs in parallel and with coincident longitudinal axes.

6. The deflecting instrument according to claim 5, wherein the piezo-electric crystal elements are not all of the same length.

7. The deflecting instrument according to claim 1, wherein three elongated crystal elements are used, these being arranged in parallel and with one end of each crystal element secured in a common unit in contact with electrical conductors.

8. A deflecting instrument according to claim 1, wherein said at least one mirror is illuminated from at least one preferably monochromatic light source, e.g. a laser, for the illumination of optical bar codes in connection with the reading of the information contained herein.

9. The deflecting instrument according to claim 1, wherein the electrical signals are modulated with the frequency.

10. The deflecting instrument according to claim 1, wherein the electrical signals are in the vicinity of a resonant frequency.

11. A deflecting instrument for light comprising at least one mirror supported by and coupled flexibly to a number of movable piezo-electric crystal elements, which are controllable under an application of electrical signals, and is arranged in such a manner that the mirror can be tilted away from a position of rest in any desired direction as a function of the electrical signals, said mirror being arranged to reflect incident light, wherein the electrical signals have a frequency, by a mechanical oscillation system comprising the mirror, the supporting and movable piezo-electric crystal elements and a flexible coupling means between them, and wherein the flexible coupling means includes at least one ball secured to each of the movable piezo-electric crystal elements, and where each ball is flexibly coupled to the mirror by means of a binding agent.

12. The deflecting instrument according to claim 11, wherein the movable elements are elongated, substantially rectangular piezo-electric crystal elements with a short side facing towards the mirror and offset for substantially half of their breadth in relation to a central area of the mirror.

13. The deflecting instrument according to claim 12, wherein four elongated, substantially rectangular piezo-electric crystal elements are used, these being arranged in pairs in parallel and with coincident longitudinal axes.

14. The deflecting instrument according to claim 13, wherein the piezo-electric crystal elements are not all of the same length.

15. The deflecting instrument according to claim 11, wherein three elongated crystal elements are used, these being arranged in parallel and with one end of each crystal element secured in a common unit in contact with electrical conductors.

16. The deflecting instrument according to claim 11, wherein said at least one mirror is illuminated from at least one preferably monochromatic light source, e.g. a laser, for the illumination of optical bar codes in connection with the reading of the information contained herein.

17. The deflecting instrument according to claim 11, wherein the electrical signals are modulated with the frequency.

18. The deflecting instrument according to claim 11, wherein the electrical signals are in the vicinity of a resonant frequency.

* * * * *

UNITED STATES PATENT AND TRADEMARK OFFICE
CERTIFICATE OF CORRECTION

PATENT NO. : 5,245,464
DATED : September 14, 1993
INVENTOR(S) : Jensen

It is certified that error appears in the above-indentified patent and that said Letters Patent is hereby corrected as shown below:

On the Title page, item [75], inventor, delete "Cobenhagen" and insert-- Copenhagen--.

On the Title page, item [73], assignee, delete "Fed. Rep. of Germany" and insert --Denmark--.

Signed and Sealed this

Fifth Day of April, 1994

Attest:

BRUCE LEHMAN

*Attesting Officer*     *Commissioner of Patents and Trademarks*